United States Patent
Leoni et al.

Patent Number: 5,158,631
Date of Patent: *Oct. 27, 1992

[54] METHOD OF MANUFACTURING A DOG-LEG SHAPED PLY OF COMPOSITE MATERIAL AND THE TOOL USED IN THE CARRYING OUT THE METHOD

[75] Inventors: Peter B. Leoni, Bethany; David A. Kovalsky, Shelton, both of Conn.

[73] Assignee: United Technologies Corporation, Hartford, Conn.

[*] Notice: The portion of the term of this patent subsequent to Feb. 25, 2009 has been disclaimed.

[21] Appl. No.: 641,384

[22] Filed: Jan. 15, 1991

[51] Int. Cl.⁵ .................................... B65H 81/00
[52] U.S. Cl. .................................... 156/174; 156/175; 156/426
[58] Field of Search .................. 416/134 A, 230, 141; 156/174, 175, 169, 173, 425, 426

[56] References Cited

U.S. PATENT DOCUMENTS

| | | | |
|---|---|---|---|
| 3,472,718 | 10/1969 | Siegmund | 156/174 |
| 3,711,350 | 1/1973 | Witzel, III | 156/169 |
| 3,471,839 | 6/1973 | Komiya | 156/174 |
| 3,765,267 | 10/1973 | Bourquardez et al. | 416/134 A |
| 3,772,119 | 11/1973 | Peck | 156/174 |
| 4,221,623 | 9/1980 | Heissler et al. | 156/174 |
| 4,378,294 | 3/1983 | Wagner et al. | 156/175 |

FOREIGN PATENT DOCUMENTS

| | | |
|---|---|---|
| 3243519 | 5/1984 | Fed. Rep. of Germany . |
| 1356393 | 6/1974 | United Kingdom ........ 156/172 |

Primary Examiner—Michael W. Ball
Assistant Examiner—Daniel J. Stemmer
Attorney, Agent, or Firm—Vernon F. Hauschild

[57] ABSTRACT

The method of fabricating selectively shaped dog-leg plies of composite material comprising unidirectionally extending high tensile strength fibers or filaments extending for the full length of the ply and embedded in a resin matrix comprising winding high tensile strength filament onto a mandrel of generally cylindrical shape but having circumferentially extending frustoconical projections extending radially therefrom so that the filament wound onto the cylindrical portion of the mandrel forms the straight legs of the dog-leg ply and so that the filament wound on the frustoconical projection of the mandrel form the arcuate central portion of the dog-leg ply.

7 Claims, 3 Drawing Sheets

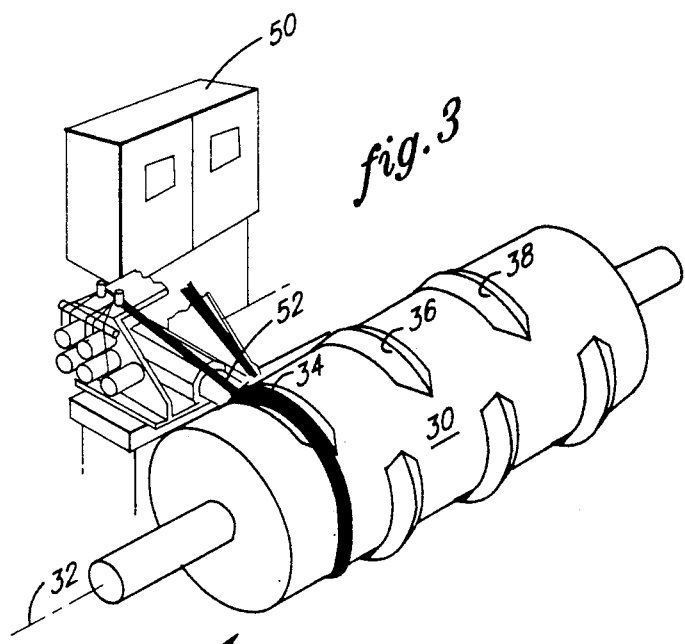
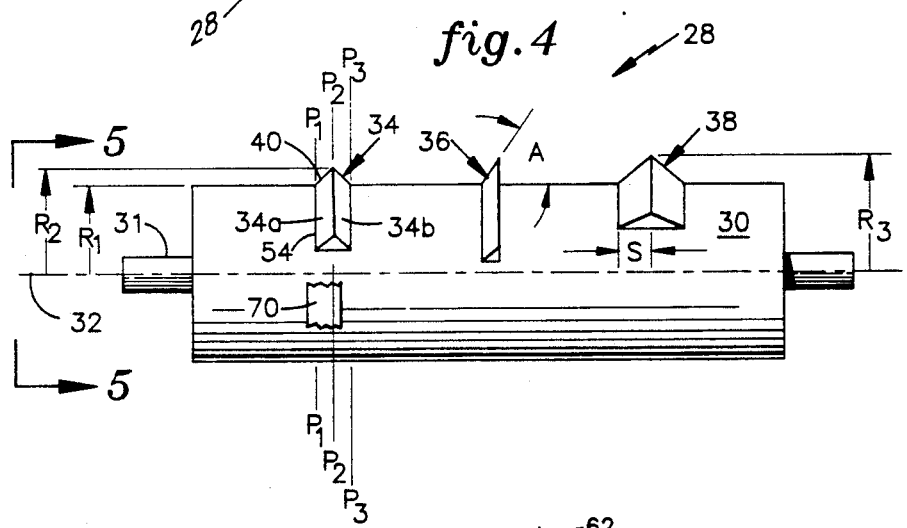
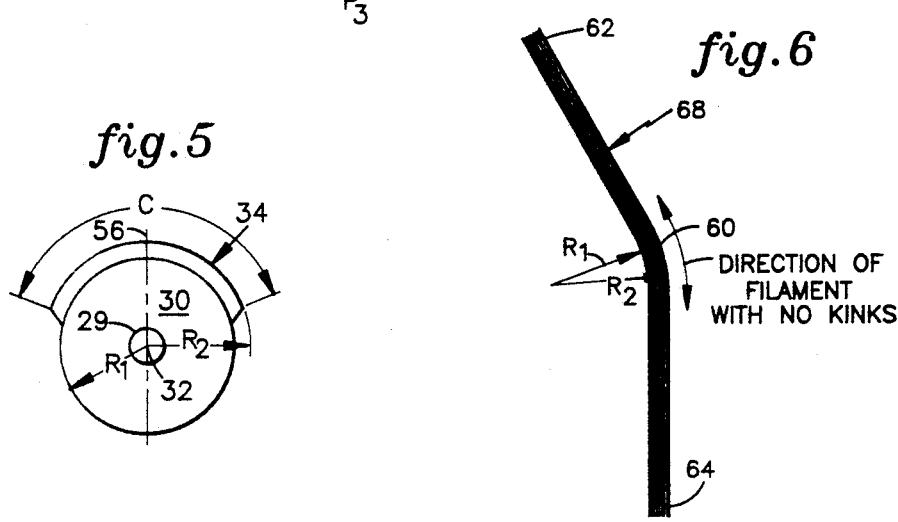

METHOD OF MANUFACTURING A DOG-LEG SHAPED PLY OF COMPOSITE MATERIAL AND THE TOOL USED IN THE CARRYING OUT THE METHOD

DESCRIPTION

This application contains similar material to an application filed on even date herewith identified as U.S. patent application No. 07/641,220 now Pat. No. 5091029 entitled "Method of Manufacturing a Unitary, Multi-Legged Helicopter Rotor Flexbeam Made Solely of Composite Materials" and invented by Geoffrey C. R. Davis and Allen J. McIntire.

TECHNICAL FIELD

This invention relates to the method of manufacturing a dog-leg shaped ply of composite material which consists of a plurality of unidirectionally extending filaments of high tensile strength fibers bonded together with a resin and utilized in articles requiring such plies which are capable of withstanding high tensile loads and accommodating various degrees of motion in operation. Such a dog-leg shaped ply is particularly useful in the fabrication of the flexbeam of a Pentaflex TM type helicopter rotor of the type which consists of an odd number of legs extending radially outwardly from a central hub, preferably five legs. Such a flexbeam is made of a plurality of dog-leg plies each of which extend from one of the legs of the flexbeam through the hub thereof and outwardly into a second substantially diametrically opposed leg of the flexbeam to transmit loads, such as centrifugal loads caused by the helicopter blade in operation, and to react motions such as pitch change, lead-lag, flapping, and torsional motions during helicopter rotor operation.

BACKGROUND OF THE INVENTION

In flexbeam helicopter rotors, it is important that the flexbeam be light in weight, be capable of withstanding substantial loads such as the centrifugal loads imposed thereon by the helicopter blade during helicopter operation, and reacting various motions such as the helicopter blade pitch change, lead-lag, flapping and torsional motions. A flexbeam made of composite materials, in particular, a plurality of high tensile strength lightweight fibers bonded together with a resin while extending in unidirectional fashion for the full length of the ply is particularly attractive in this environment. Two dog-leg shaped plies of such composite material can be formed and positioned mirror image to extend either for the full length or a portion of the length of the flexbeam leg, in combination with other composite plies, and then bifurcate in passing through the flexbeam hub and extend either for the full length or a portion of the length and with each of the dog-leg plies occupying half of the width of two substantially oppositely positioned legs. This results in very favorable load transfer, particularly centrifugal load transfer, between the various legs of the flexbeam, and also permits the accommodation of the required motions because of the flexibility of the flexbeam members. Such a flexbeam and its method of manufacture are described in U.S. application Ser. No. 07/641,237 filed on even date herewith, in the name of Doolin et al and entitled "A Unitary, Multi-Legged Helicopter Rotor Flexbeam Made Solely of Composite Material and the Method of Manufacturing Same" and U.S. application Ser. No. 07/641,220 now U.S. Pat. No. 5091029 filed on even date herewith, in the name of G. Davis et al and entitled "Method of Manufacturing a Unitary, Multi-Legged Helicopter Rotor Flexbeam Made Solely of Composite Materials", all assigned to a common assignee.

Accordingly, it is very important to be able to produce such dog-leg plies inexpensively, rapidly, and in production quantities in the fabrication of such flexbeam helicopter rotors.

It is known in the prior art to produce such plies of fibers by winding them onto a rotating mandrel. For example, in German Patent No. 3,243,519 a cylindrical mandrel is shown, and rhomboid shaped projections are positioned axially therealong. As understood, the teaching of the German patent is to wind fibers or filament onto the mandrel in the areas between the rhomboid projections so as to form curved spring rods. It is important to note, however, that the German patent does not wind filament over the rhomboid shaped projections but rather winds the filament between the projections into the voids formed there-between. U.S. Pat. No. 3,472,718 to W. P. Siegmund, granted Oct. 14, 1969, on "Methods of Making Display Devices" fabricates a display devices which consists of several stacked shelves, some of which are rectangular in shape and which are formed by winding filament onto a cylindrical mandrel, and some of which are arcuate in shape and which are formed by winding filament onto a conical mandrel. Siegmund therefore is capable of producing both straight filaments and arcuate filaments, but not the combination of the two. To produce a dog-leg shaped filament following the Siegmund teaching, it would be necessary to join straight filament plies to the opposite ends of an arcuate filament ply. This would not provide a dog-leg ply having high tensile strength fibers extending for the full length thereof, but would rather include joints of resin or other bonding material between the opposite ends of the arcuate ply and the two straight plies. These resin joints would be unable to withstand high tensile forces such as the centrifugal force of a helicopter rotor in operation. Contrary to this, we teach producing a dog-leg ply having high strength filaments extending unidirectionally for the full length thereof so that the ply has high tensile strength qualities and is able to transmit high tension loads therethrough, for example, in connection with the operation of the flexbeam helicopter rotor.

DISCLOSURE OF THE INVENTION

Therefore, it is an object of this invention to teach a method of fabricating a dog-leg ply which consists of a plurality of high tensile strength fibers extending unidirectionally and without kinks for the full length thereof and bonded together by an appropriate bonding medium to produce a composite ply of dog-leg shape.

It is a further objection of this invention to teach the method of producing at least one such dog-leg shaped ply comprising winding high strength prepreg filament onto a cylindrical mandrel mounted for rotation about its axis of rotation. This mandrel has at least one selectively sized circumferentially extending frustoconical projection extending therefrom so that filament may be wound from a filament winding machine onto the mandrel in spool fashion to extend over both the cylindrical portion of the mandrel and the frustoconical projection extending therefrom. When such a ply so laid up is cut from the mandrel at a station substantially diametrically opposite the center of the frustoconical projection, and laid on a flat surface, a dog-leg shaped ply results having an arcuate center section and two straight legs projecting tangentially from the opposite ends of the arcuate center section.

It is a further object of this invention to teach such a method of producing such a dog-leg ply in which the inner radius of the frustoconical projection defines substantially the inner radius of the arcuate portion of the dog-leg ply, the outer radius of the frustoconical projection defines substantially the outer radius of the arcuate portion of the dog-leg ply, the length of the frustoconical projection defines the length of the arcuate portion of the dog-leg ply, and the straight legs projecting from the ends of the arcuate portion of the ply ar formed by the filament wound onto the cylindrical portion of the mandrel.

It is still a further object of this invention to teach such a method in which several such frustoconical projections extend from the outer surface of a rotatable mandrel so that such dog-leg shaped plies may be made in production quantities.

It is still a further object of this invention to use filament which is impregnated with resin before winding.

It is still a further object of this invention to teach such a method in which the filament is wound onto the mandrel dry, but utilizing a binder such that, once the ply is cut from the mandrel following lay up, resin may be added thereto thereafter, rather effecting the lay up using preimpregnated filaments.

It is still a further object of this invention to teach such a method in which the mandrel is prepared for filament lay up by applying a break-away layer directly to the mandrel surface onto which the filament will be wound to effect clean break-away of the wound filament from the mandrel following completion of the winding operation, and which break-away layer assists in handling the ply once separated from the mandrel.

It is still a further object of this invention to teach such a method in which the dog-leg shaped ply so wound upon the mandrel, once removed, is cut to the desired final shape and cured utilizing the application of heat and pressure.

It is still a further object of this invention to teach a lay-up tool capable of producing a dog-leg ply of unidirectionally extending high tensile strength fibers, which tool consists of cylindrical mandrel having at least one frustoconically shaped projection extending from the outer periphery thereof and circumferentially therearound. The projection has an inner radius lying in a plane perpendicular to the cylindrical mandrel axis of rotation and which will substantially define the inner radius of the arcuate portion of the ply to be laid up thereon and an outer radius axially spaced along the cylindrical mandrel axis from the first radius and being larger than the first radius and also lying in a plane perpendicular to the mandrel axis of rotation and so that a smooth frustoconical surface is formed therebetween.

It is still a further object of this invention to teach such a lay-up tool in which a plurality of such frustoconical projections are positioned axially along the cylindrical mandrel for the production of dog-leg plies in production quality.

BRIEF DESCRIPTION OF THE DRAWINGS

FIG. 3 is a perspective showing of the unique mandrel use in the fabrication of our dog-leg ply.

FIG. 4 is a side view of our mandrel utilized to illustrate the dimensions involved.

FIG. 5 is a view taken along line 5—5 of FIG. 4.

FIG. 6 is a showing of the dog-leg ply fabricated utilizing our method and tool.

BEST MODE FOR CARRYING OUT THE INVENTION

Figure 1:
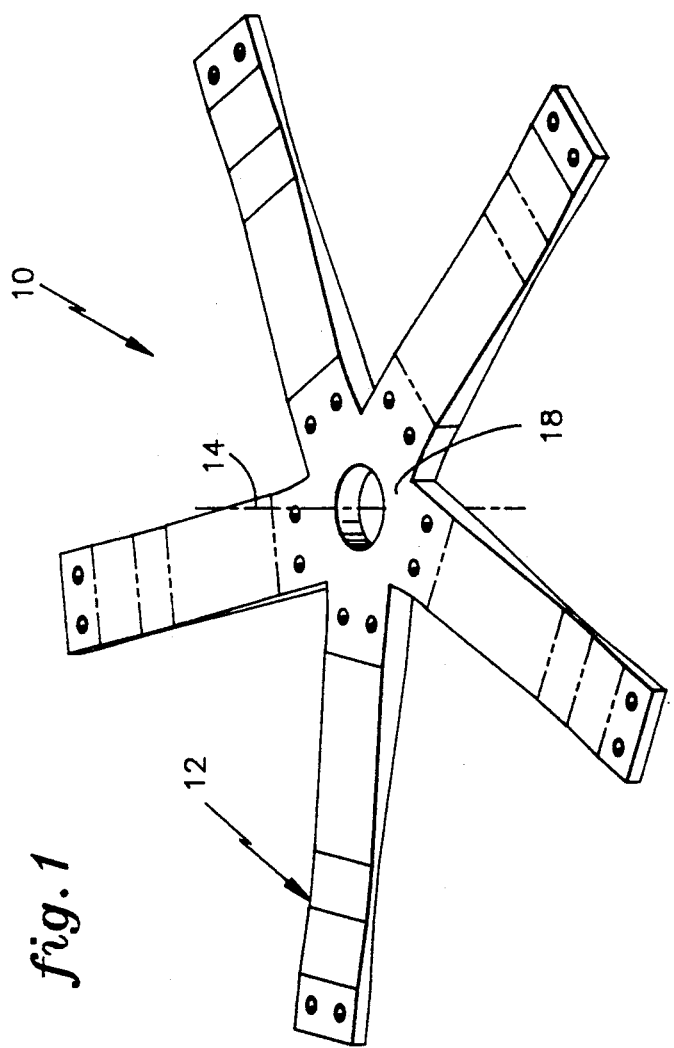
FIG. 1 is a perspective showing of a five-legged flexbeam for a helicopter rotor.

As shown in FIG. 1, flexbeam 10 includes five legs 12 projecting from central hub 18 for rotation about axis of rotation 14. Flexbeam 10 is fabricated from composite material and utilizes two mirror image dog-leg plies of unidirectionally extending high tensile strength filaments bonded together by resin, or the like, and extending from each leg 12 of flexbeam 10 for the full length thereof, or the partial length thereof, and then bifurcating in passing through hub 18 and extending into the two substantially diametrically opposite legs 12 for either the full length or a portion of the length thereof, and for one half of the width thereof. These dog-leg shaped plies of resin bonded high tensile strength fibers are capable of withstanding very substantially centrifugal loads of the type generated by a helicopter rotor in operation and transmitting those loads from one of the legs 12 flexbeam 10 into the two substantially diametrically opposite legs for load distribution purposes.

Figure 2:
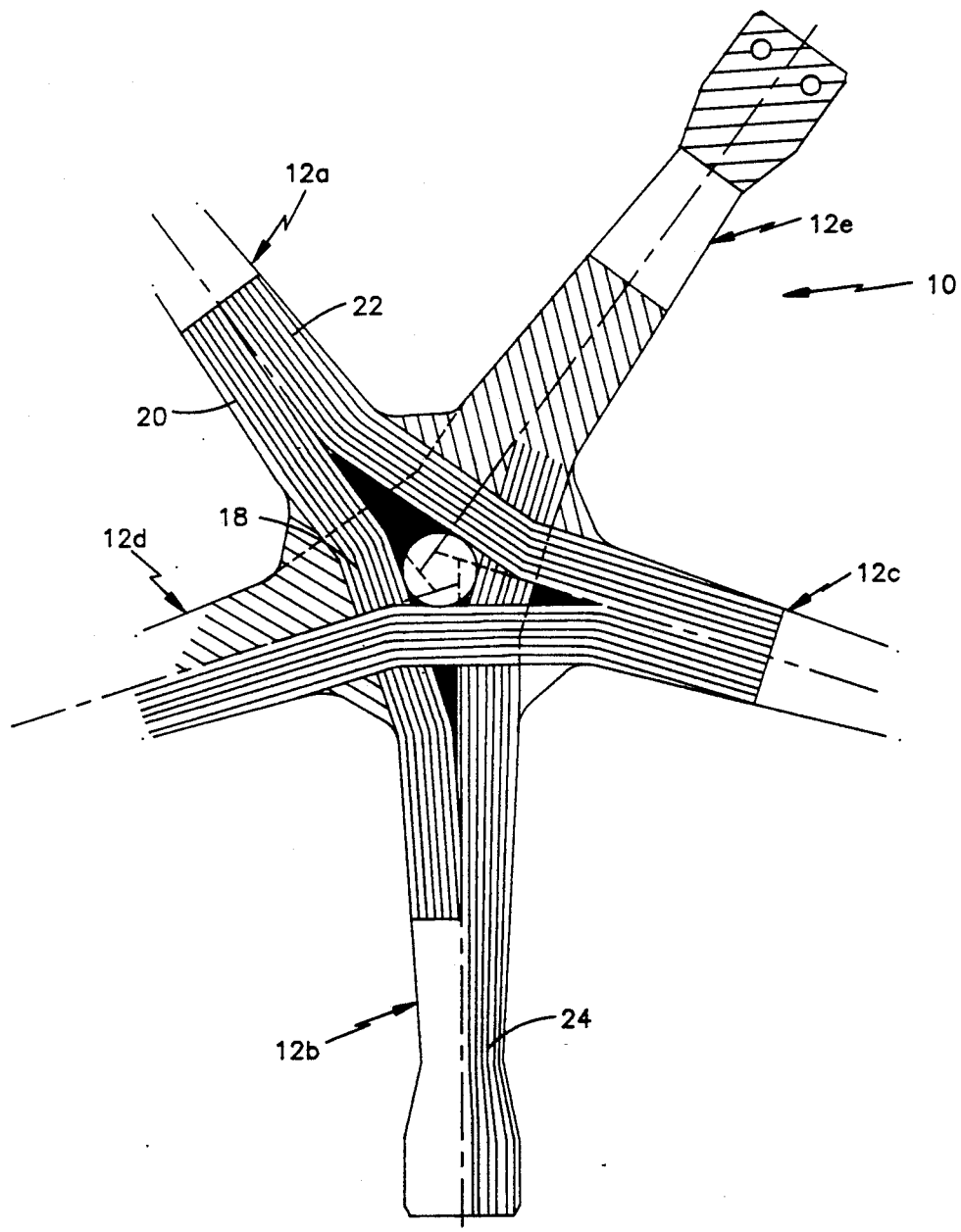
FIG. 2 is a partial top view of such a five-legged flexbeam for use in a helicopter rotor partially broken away to show the use of dog-legged plies in the fabrication thereof.

Referring to FIG. 2, we see the construction of flexbeam 10 in greater particularity. It will be noted that flexbeam 10 comprises many dog-leg shaped plies of the type of interest in our invention. For example, leg 12a comprises one end of such a dog-leg ply 20 and an end of a second such dog-leg ply 22, each of which occupy one half of the width of leg 12a with dog-leg ply 20 extending through hub portion 18 and then into leg 12b. Similarly, dog-leg shape ply 22 extends through hub 18 and into leg 12c. It will therefore be seen that the ply of unidirectionally extending high tensile strength fibers formed by the combination of dog-leg plies 20 and 22 occupy the full width of leg 12a, each pass through hub 18 as they bifurcate and extend into substantially diametrically opposite legs 12b and 12c to leg 12a. Therefore, any centrifugal load being carried through leg 12a is imparted through the dog-leg plies 20 and 22 into legs 12b and 12c, respectively, for load distribution purposes. In similar fashion, dog-leg plies, not shown, similar to 20 and 22 occupy leg 12d and extend through hub 18 and into legs 12e and 12c. Similar dog-leg plies extend from leg 12b into legs 12a and 12e, from leg 12c into legs 12d and 12a, and from leg 12e into legs 12d and 12b.

A similar pattern of dog-leg plies extend for the full length of each of legs 12a through 12e. One such ply is shown at 24 where it extends for the full length of leg 12b and for one half the width thereof, and then through hub 18 and into leg 12e where it occupies one half the width thereof. A ply similar to 24 occupies the opposite side of leg 12b, extends for the full length thereof through hub 18 and into leg 12a. Similar full length dog-leg plies made of high tensile strength fibers extending unidirectionally and bonded by resin, or other suitable bonding material to form a composite ply, extend for the full length of each of legs 12c, 12e, 12a and 12d, bifurcate in passing through hub 18 and then extend into diametrically opposite the substantially diametrically opposite legs of the flexbeam 10.

Now viewing FIG. 3, we will describe the manner in which we fabricate the dog-leg ply using our preferred method and tool. The tool 28 is a mandrel which is mounted in conventional fashion about its center line and axis of rotation 32. Mandrel 28 includes cylindrical portion 30 which is of circular cross section and concentric about axis 32. Mandrel 28 has end shafts 29 and 31 which are received in conventional bearings to support mandrel 28 for rotation about axis 32. Projecting from the outer periphery of cylindrical member 30 are one or more circumferentially extending projections 34, 36 and 38 which extend for a portion of the circumference of the cylindrical member 30 and which are frustoconical in shape.

As best shown in FIG. 4, frustoconical projection 34 may be mirror image in shape, composed of two frustoconical sections 34a and 34b. The inner radius $R_1$ of frustoconical portion 34a is also the radius of cylindrical portion 30 and, as best shown in FIG. 4, lies in plane $P_1$ which is perpendicular to axis 32. The outer radius $R_2$ of frustoconical portion 34a is spaced axially along axis 32 from radius $R_1$, is selectively larger than radius $R_1$ and is also positioned in a plane, $P_2$, which is perpendicular to axis of rotation 32. Radii $R_1$ and $R_2$ form the radial boundaries of frustoconical projection 34a and the projection has smooth frustoconical surface 40 extending between the inner radius $R_1$ and outer radius $R_2$. Projection 34 extends, as best shown in FIG. 5, circumferentially for a portion of the circumference of cylinder 36 through selected arc C, which will define the length of the arcuate ply which will be laid upon cylindrical portion 34. As shown in FIG. 4, frustoconical portion 34b is mirror image or allochiral to frustoconical projection 34a. Therefore, two identical dog-leg plies may be laid up on portions 34a and 34b of frustoconical projection 34.

Mandrel 28 may also include circumferential projection 36 which is similar to frustoconical projection 34a and, if desired, the circumferential dimension C thereof could be larger or smaller than the circumferential dimensions of projection 34 and the corresponding angle of inclination A of the frustoconical surface at projection 36 could be larger or smaller than the angle of the frustoconical portion 34a and 34b, depending upon the type and variety of dog-leg plies which are to be formed.

Similarly, circumferential projection 38 shown in FIG. 4 may be fabricated to have a greater outer radius $R_3$ than the outer radius $R_2$ of projection 34, may be of less circumferential dimension C, and there may be greater spacing s between its inner radius $R_1$ and outer radius $R_3$, depending upon the type and shape of dog-leg plies which are to be formed on mandrel 28.

As best shown in FIG. 3, filament winding machine 50 is positioned and programmed to wind a filament 52 of high tensile strength fiber onto mandrel 28 at an angle tangential to the outer surface of cylindrical portion 30 thereof. Filament winding machine 50 commences laying filament 52 around rotating mandrel 28 substantially along plane $P_1$ of frustoconical projection 34 substantially at the intersection 54 between the outer surface of cylindrical member 30 and frustoconical surface 40 of projection 34. The first loop so wound forms a loop passing over the cylindrical portion 30 of mandrel 28 lying in plane $P_1$ and intersection 54. Each succeeding loop of filament is laid up in spool fashion adjacent to next proceeding laid up filament both along the cylindrical surface 30 of mandrel 28 and frustoconical surface 40, working toward plane $P_2$ at the outer radius $R_2$ of cylindrical projection 34. The high tension strength filament 52 is in this fashion wound in spool fashion between planes $P_1$ and $P_2$ with each loop extending over both a portion of the cylindrical member 30 of mandrel 28 and frustoconical surface 40 of projection 34 until substantially the entire area between the planes $P_1$ and $P_2$ are covered by filament so wound. If the user is desirous of forming two identical dog-leg plies at the same time, the winding may continue between plane $P_2$ and plane $P_3$, which is also perpendicular to axis of rotation 32 and defines the intersection between frustoconical projection 34b and the outer surface of cylindrical surface 30.

For purposes of further description of how the dog-leg ply is fabricated, it will be considered that the high tensile strength filament has been wound between planes $P_1$ and $P_2$. The filament so wound is then cut preferably along a line parallel to axis 32 and diametrically opposite the circumferential center 56 (See FIG. 5) of frustoconical projection 34. When such a ply so removed from the mandrel is laid upon a flat surface, it formed the dog-leg ply 58 shown in FIG. 6 which includes central arcuate portion 60, which was wound upon surface 40 of frustoconical projection 34, and two straight legged portions 62 and 64 which were wound upon the cylindrical portion 30 of mandrel 28 and project tangentially from central portion 60 and form dog-leg ply 58 therewith. The inner radius $R_1$ of arcuate portion 60 and the outer radius $R_2$ of arcuate portion 60 are determined by the radius $R_1$ and $R_2$ of projection 34. As previously stated, the length of arcuate portion 60 is determined by the circumferential dimension or length C (FIG. 5) of projection 34.

It will be evident that filament so wound upon projection 34b will form an identical ply with that wound upon surface 34a. It will further be evident that filament wound upon cylindrical portion 30 and frustoconical projections 36 and 38 will produce a different shaped dog-leg ply with different conical portions 60 and straight legged portions 62 and 64 from that shown in FIG. 5.

In this fashion, it will be seen that a dog-leg ply, or several dog-leg plies, can be fabricated by winding high tensile strength filament in spool fashion onto the cylindrical portion 30 of mandrel 28 and frustoconical projections such as 34, 36 and 38, projecting circumferentially around and radially outwardly from cylindrical member 30 of mandrel 28.

In our preferred embodiment, high tensile strength filament 52, which may be made of fiberglass, carbon/graphite, silicone carbite, quartz, aramid, oriented polyfilm, aluminum oxide, and boron is preferably preimpregnated with a resin, such as an epoxy, before being wound onto mandrel 28. It would also be possible, however, to wind filament 52 onto mandrel 28 dry, but utilizing a binder to hold the loops of the filament together as one so that the resin may be applied to the dog-leg ply after it is wound, cut and removed from the mandrel.

Whether a prepreg filament is used or a dry filament which is impregnated after winding, the dog-leg ply so formed will eventually be cured utilizing appropriate heat and pressure to produce a ply of unidirectional, high tensile strength fiber forming a dog-leg and with each fiber extending the full length of the ply 58, thereby achieving a dog-leg shaped ply with the capability of withstanding very high tensile loads imposed thereon.

In addition, before winding the filament 52 onto the mandrel, the mandrel is treated by having a break-away layer, such as that shown at 70 in FIG. 4 on the surface of the mandrel against which the filament 52 is to be wound. The purpose of the break-away layer 70 is to prevent the filament from becoming permanently attached to the mandrel, to assist in removal of the cut filament so wound onto the mandrel, and to support the filament once cut from the mandrel after winding to assist in the handling the ply so formed prior to curing. Break-away layer 70 may be made of scrim cloth or veil mat made of fiberglass, aramid, carbon/graphite and polyamid.

It will therefore be seen that utilizing our method, dog-leg plies of high tensile strength fibers embedded in resin to form a composite ply having the high tensile strength fiber extending unidirectionally throughout the full length of the ply may be fabricated by so winding the high tensile strength filament onto our cylindrical mandrel 28 which includes frustoconical projections extending circumferentially about and radially therefrom.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. The method of fabricating a dog-leg shaped ply of composite material consisting of a series of unidirectional high tensile strength filaments comprising the steps of:
   a. providing a mandrel of cylindrical shape mounted for rotation about the cylinder axis and having at least one frustoconical projection extending outwardly from the periphery thereof and having an inner radius lying in a plane perpendicular to the cylinder axis and which inner radius is the radius of the cylinder, and an outer radius lying in a plane perpendicular to the cylinder axis and which outer radius is larger than the inner radius and spaced along the cylinder axis therefrom to define the radial dimensions of the frustoconical surface extending therebetween, and the projection further extending for a portion of the circumference of the cylinder;
   b. providing a filament winding machine positioned to wind filament in spool fashion onto the mandrel with the filament being so wound extending substantially tangentially to the mandrel cylindrical surface;
   c. winding a high tensile strength filament in spool fashion onto the mandrel utilizing the filament winding machine such that the first loop of filament so wound extends circumferentially around the mandrel and is laid up substantially against the surface of the frustoconical projection which defines its inner radius;
   d. progressively winding the filament around the mandrel so that each succeeding filament loop is positioned immediately adjacent the filament loop previously laid up as it engages the cylindrical surface of the mandrel and then passes over the frustoconical portion at a slightly greater radius than the preceding filament loop so wound;
   e. continuing to so wind filament onto the mandrel until the final loop of the filament substantially engages the frustoconical portion at its outer radius;
   f. cutting the filament so wound along the axis of the mandrel at a station substantially diametrically opposite the frustoconical projection center point, and
   g. laying the wound filament so cut from the mandrel on a flat surface so that it forms a dog-leg ply having an arcuate center portion and two straight leg portions extending tangentially from the arcuate center portion and so that the ply consists of a plurality of unidirectionally extending filaments extending for the full length of the ply.

2. The method according to claim 1 wherein the filament being wound onto the mandrel is preimpregnated with resin.

3. The method according to claim 2 wherein the filament is selected from the group consisting of fiberglass, carbon/graphite, silicone carbite, quartz, aramid, oriented polyfilm, aluminum oxide, and boron.

4. The method according to claim 1 including the steps of applying a binder to the frustoconical and cylindrical portion of the mandrel so that as the filament is wound thereon, it is held together by the binder, and including the additional step of impregnating the dog-leg shaped ply so cut from the mandrel and laid out on a flat surface with resin.

5. The method according to claim 3 and including the step of curing the resin impregnated ply material after it is cut from the mandrel and laid in a flat position to form the dog-leg shaped ply.

6. The method according to claim 1 and including the additional step of preparing the mandrel prior to filament winding thereonto by applying a break-away layer of material onto the surface of the mandrel upon which the filament is to be wound.

7. The method according to claims 3 or 4 comprising the additional step of cutting the dog-leg ply of composite material to a precise desired final dog-leg shape after its removal from the mandrel.

* * * * *